J. H. BRACKIN.
INSECT EXTERMINATOR.
APPLICATION FILED APR. 18, 1918.
1,294,036.
Patented Feb. 11, 1919.
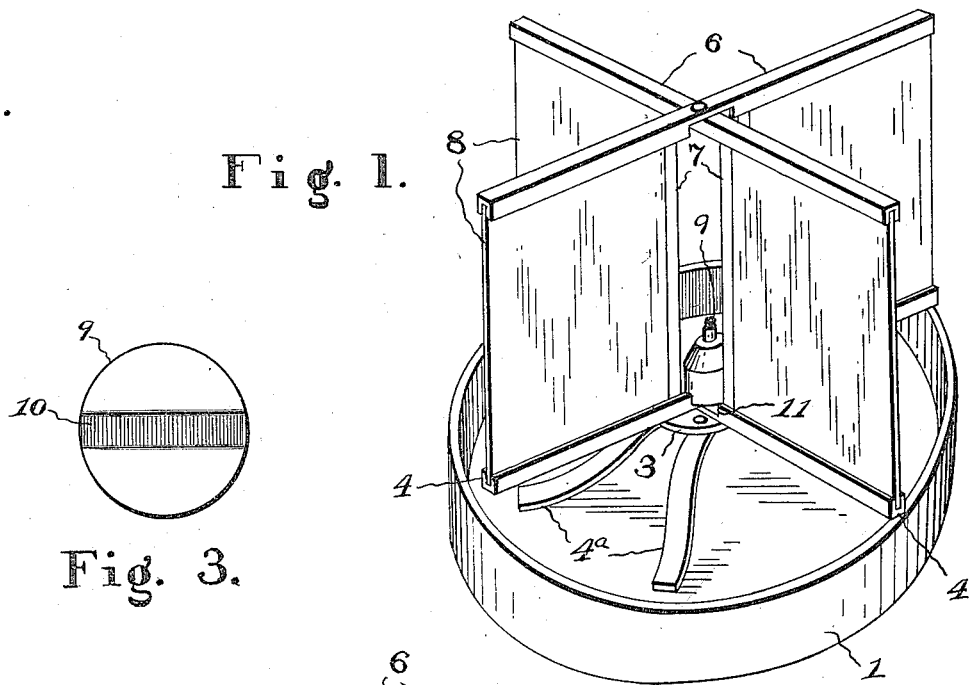
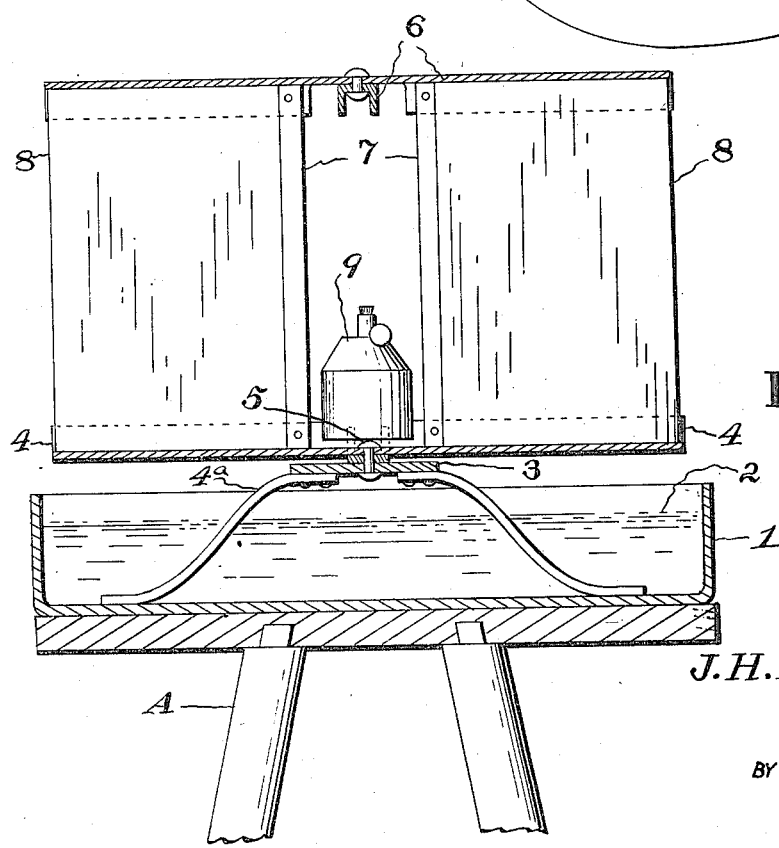
J. H. Brackin
INVENTOR:
BY H. S. Hill
ATTORNEY.

UNITED STATES PATENT OFFICE.

JOHN HARVEY BRACKIN, OF HOCKESSIN, DELAWARE.

INSECT-EXTERMINATOR.

1,294,036.  Specification of Letters Patent.  Patented Feb. 11, 1919.

Application filed April 18, 1918. Serial No. 229,252.

*To all whom it may concern:*

Be it known that I, JOHN HARVEY BRACKIN, a citizen of the United States, residing at Hockessin, in the county of New Castle, State of Delaware, have invented a new and useful Insect-Exterminator; and I do hereby declare the following to be a full, clear, and exact description of the invention, such as will enable others skilled in the art to which it appertains to make and use the same.

The present invention relates to an insect exterminating device, and has for its object to provide a device of this character which embodies novel features of construction whereby large numbers of night flying insects can be destroyed in an effective and inexpensive manner, thereby enabling the harmful insects in orchards and gardens to be kept under control.

Further objects of the invention are to provide a device of this character which is comparatively simple and inexpensive in its construction, which can be readily positioned in an orchard or garden, which will operate in a most effective manner to attract night flying insects, and which will destroy those insects which are attracted.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a perspective view of an insect exterminator constructed in accordance with the invention.

Fig. 2 is a vertical sectional view through the same.

Fig. 3 is a bottom plan view of a preferred construction of oil burning lamp which is used in connection with the exterminator.

Corresponding and like parts are referred to in the following description and indicated in all the views of the drawings by the same reference characters.

Referring to the drawings which illustrate one possible embodiment of the invention, the reference character A designates a suitable stand which may be erected in the garden or orchard for supporting the device. A pan 1 for containing some fluid material such as crude oil 2 is placed upon the stand A. Arranged centrally above the bottom of the pan 1 is a plate 3, said plate being supported in an elevated position by means of strips $4^a$ which radiate from the edges thereof and have the free ends thereof bent downwardly so as to form legs for supporting the plate. The lower ends of the legs $4^a$ are submerged in the crude oil 2 in the pan, while the plate 3 is held at an elevation above the oil. A lower pair of intersecting channel strips 4 are pivotally secured to the center of the plate 3 by means of a rivet 5. A similar intersecting pair of opposed channel strips 6 are arranged above the lower channel strips 4, the corresponding upper and lower strips being connected at points slightly spaced from their intersection by upright braces 7 which serve to hold the two sets of strips in a properly spaced relation. Reflecting plates 8 are inserted in the free end portions of the corresponding upper and lower channel strips 4 and 6, said reflecting plates being of any suitable construction and having polished sides so that they will reflect light rays. These double faced reflectors are removable, being engaged and held frictionally in position by the side flanges of the channel strips, although they can be forcibly pulled out of position and cleaned or polished at any time. Arranged within the space between the upright braces 7 is a suitable lamp 9. An electric light may be used, if available, although an oil burning lamp such as that indicated upon the drawings will be found to answer the requirements. The base of the lamp may be provided with a transversely extending raised portion 10 adapted to receive the flanges of one of the lower channel strips 4, the flanges of the other channel strip being cut away at the point of intersection, as indicated at 11. The lamp may thus be properly positioned and held firmly against accidental displacement. The reflectors 8 will operate in connection with the lamp to produce a glare or dazzling effect which will attract the night flying insects. These insects will naturally attempt to circle around the light, and in so doing will strike against the reflector plates and drop into the crude oil 2. Large quantities of insects can be destroyed in this manner, and this will be found very helpful in keeping the insect life in a grove or garden under control.

Having thus described the invention, what I claim as new and desire to secure by Letters Patent is:—

1. An insect exterminator including corresponding upper and lower sets of intersecting channel strips, upright brace members connecting the channel strips at points spaced from the intersection thereof, a source of light arranged within the space between the upright brace members, removable reflectors slidably inserted between the ends of the corresponding channel strips and radiating from the source of light, a pan, and means for supporting the channel strips over the pan.

2. An insect exterminator including corresponding upper and lower sets of intersecting strips, upright reflecting plates between the corresponding ends of the upper and lower strips, a lamp arranged between the inner edges of the reflectors and resting upon the lower set of strips at the intersection thereof, the base of the lamp being recessed to receive one of the strips, supporting means for the intersecting strips and reflectors, and means for collecting the insects attracted by the reflectors.

In testimony whereof I have signed my name to this specification in the presence of two subscribing witnesses.

JOHN HARVEY BRACKIN.

Witnesses:
 ELWOOD D. BRACKIN,
 SAMUEL E. COOPER.

Copies of this patent may be obtained for five cents each, by addressing the "Commissioner of Patents, Washington, D. C."